(12) United States Patent
Nakajima et al.

(10) Patent No.: US 9,588,470 B2
(45) Date of Patent: Mar. 7, 2017

(54) FIXING BELT

(75) Inventors: Shingo Nakajima, Osaka (JP); Jun Sugawara, Osaka (JP); Daisuke Shoji, Sennan-gun (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 0 days.

(21) Appl. No.: 13/579,976

(22) PCT Filed: Jun. 22, 2011

(86) PCT No.: PCT/JP2011/064216
§ 371 (c)(1),
(2), (4) Date: Aug. 20, 2012

(87) PCT Pub. No.: WO2012/029380
PCT Pub. Date: Mar. 8, 2012

(65) Prior Publication Data
US 2012/0315418 A1 Dec. 13, 2012

(30) Foreign Application Priority Data
Aug. 31, 2010 (JP) .................. 2010-194092

(51) Int. Cl.
B32B 27/06 (2006.01)
B32B 1/08 (2006.01)
(Continued)

(52) U.S. Cl.
CPC ......... *G03G 15/2057* (2013.01); *C09D 5/002* (2013.01); *C09D 7/1216* (2013.01);
(Continued)

(58) Field of Classification Search
CPC ........ C08K 5/41; C09D 5/002; C09D 7/1216; G03G 15/2057; Y10T 428/1359; Y10T 428/1393; B32B 27/06; B32B 27/18
(Continued)

(56) References Cited

U.S. PATENT DOCUMENTS

| 5,582,886 A * | 12/1996 | Kitajima et al. ........... 428/36.91 |
| 2007/0292173 A1* | 12/2007 | Ikeda et al. .................. 399/307 |
| 2009/0142099 A1* | 6/2009 | Oshima .................. G03G 15/02 399/176 |

FOREIGN PATENT DOCUMENTS

| CN | 1134871 A | 11/1996 |
| CN | 101036087 A | 9/2007 |

(Continued)

OTHER PUBLICATIONS

English machine translation of JP 2002-338801.*

*Primary Examiner* — Yan Lan
(74) *Attorney, Agent, or Firm* — Drinker Biddle & Reath LLP

(57) ABSTRACT

Provided is a fixing belt which has a high effect of preventing offset and the like and is capable of forming a clear image, which has high adhesion between a surface layer and another layer, and which has no problems in terms of appearance. The fixing belt includes a tubular base, a surface layer provided as an outermost layer and composed of a fluororesin A, and a primer layer provided in contact with the surface layer, wherein the primer layer is composed of a material obtained by mixing a fluorine-containing ion conductive agent, such as a fluorine-containing alkali metal salt, with a fluororesin B.

4 Claims, 1 Drawing Sheet

(a)

(b)

(51) Int. Cl.
  *G03G 15/20* (2006.01)
  *C09D 5/00* (2006.01)
  *C09D 7/12* (2006.01)
  *B32B 27/18* (2006.01)
  *C08K 5/41* (2006.01)

(52) U.S. Cl.
  CPC .............. *B32B 27/06* (2013.01); *B32B 27/18* (2013.01); *C08K 5/41* (2013.01); *Y10T 428/1359* (2015.01); *Y10T 428/1393* (2015.01)

(58) Field of Classification Search
  USPC ..................... 428/36.9, 36.91, 36.92, 35.9
  See application file for complete search history.

(56) References Cited

FOREIGN PATENT DOCUMENTS

| | | | |
|---|---|---|---|
| CN | 101576727 A | | 11/2009 |
| JP | 7-186162 | | 7/1995 |
| JP | 8-220907 | | 8/1996 |
| JP | 2001-40102 | | 2/2001 |
| JP | 3305467 | | 5/2002 |
| JP | 2002-338801 | | 11/2002 |
| JP | 2003-5555 | | 1/2003 |
| JP | 2008-222942 | * | 9/2008 |
| WO | 2004/018201 | | 3/2004 |

\* cited by examiner

FIXING BELT

TECHNICAL FIELD

The present invention relates to a fixing belt used for fixing a toner image transferred to a recording sheet or the like by heating in an image-forming apparatus.

BACKGROUND ART

In a final stage of printing or copying in image-forming apparatuses such as an electrophotographic copying machine, a facsimile, and a laser beam printer, a heat fixing method is generally employed in which a fixing belt heated by a heating source is brought into contact with a pressure roller under pressure, and a transfer-receiving material having a transferred toner image thereon is caused to pass between the fixing belt and the pressure roller to melt unfixed toner by heating. The fixing belt used in this stage requires, for example, elasticity and thermal conductivity to obtain good fixability, and a mechanical strength to obtain good durability and good wear resistance. In order to prevent offset (double transfer) and the like and to form a clear image, the fixing belt further requires a good property of releasing a toner (i.e., releasing property) and a property that electrostatic charging does not tend to occur and electrostatic charge is easily eliminated.

As a fixing belt that satisfies these various requirements, a fixing belt (fixing roller) having a structure including a tubular base composed of a metal, polyimide, or the like, a resin layer (surface layer) composed of a fluororesin or the like having a good releasing property and good wear resistance, and a primer layer disposed between the base and the surface layer has been proposed. Furthermore, for example, in order to improve fixability of a color toner, a fixing belt (fixing sleeve) having a structure in which an elastic layer composed of silicone rubber or the like is further provided between a base and a surface layer, and primer layers are provided between these layers has also been proposed.

In addition, for example, in order to suppress electrostatic charging and easily eliminate electrostatic charge and to prevent offset and form a clear image, a method for imparting electrical conductivity to the primer layer, and a method for providing an electrically conductive layer have also been proposed.

For example, Japanese Patent No. 3305467 (PTL 1) discloses a fixing tube (fixing belt) including an electrically conductive primer layer or an electrically conductive layer containing 1% to 40% by weight of a carbon (carbon black) powder. Similarly to a primer layer of a common fixing belt, the electrically conductive primer layer in PTL 1 has a function of a bonding layer that bonds a fluororesin film serving as a top coat (surface layer) and a polyimide tube serving as a base. However, by incorporating a carbon black powder, electrical conductivity is imparted to the primer layer, and thus the electrically conductive primer layer has also a function of an electrically conductive layer for preventing offset and forming a clear image.
PTL 1: Japanese Patent No. 3305467

SUMMARY OF INVENTION

Technical Problem

In the case where a surface layer is composed of a fluororesin, a primer disposed between the surface layer and another layer is preferably composed of a material mainly containing a fluororesin in order to improve an adhesive force with the fluororesin constituting the surface layer. However, since the fluororesin itself does not have electrical conductivity, it is preferable to incorporate a large amount of electrically conductive filler such as a carbon black powder or a metal oxide in the primer layer in order to impart electrical conductivity and prevent offset.

However, it is known that, in the case where a large amount of electrically conductive filler is added to a primer layer containing a fluororesin component, a fluorine component that contributes to adhesion does not sufficiently appear on the surface of the primer layer, thereby decreasing the adhesive force. That is, incorporation of a large amount of an electrically conductive filler in the primer layer decreases the adhesive force between a surface layer composed of a fluororesin or the like and a base composed of polyimide or the like or between a surface layer composed of a fluororesin or the like and an elastic layer composed of silicone rubber or the like. Consequently, a problem of a decrease in sheet-passing durability occurs.

Furthermore, in the case where a transparent fluororesin is used as the surface layer and a carbon black powder is used as an electrically conductive filler, when the carbon black powder is incorporated in a primer layer in a large amount, unevenness is generated and the appearance may be impaired because of the black color of the carbon black.

Accordingly, it has been desired to develop a primer layer provided between a surface layer and another layer, wherein the primer layer has high electrical conductivity for preventing offset and the like and forming a clear image and has high adhesion between the surface layer and the other layer. Furthermore, it has also been desired to develop a primer layer, the appearance of which is not impaired even in the case where a transparent fluororesin is used as the surface layer. Furthermore, it has been desired to develop a fixing belt which includes such a primer layer, which has a high effect of preventing offset and the like and is capable of forming a clear image, which has high adhesion between a surface layer and another layer, and which has no problems in terms of appearance.

An object of the present invention is to provide a fixing belt which has a high effect of preventing offset and the like and is capable of forming a clear image, which has high adhesion between a surface layer and another layer, and which has no problems in terms of appearance.

Solution to Problem

As a result of intensive studies in order to solve the above problems, the inventors of the present invention found that high electrical conductivity can be imparted to a primer layer by using a fluorine-containing ion conductive agent instead of using a carbon black powder or the like and that it is possible to obtain a fixing belt which has high adhesion between a surface layer and another layer and which has no problems in terms of appearance. This finding led to the completion of the present invention. Specifically, the above problems are solved by the inventions having configurations described below.

An invention according to the disclosure is
a fixing belt including a tubular base; a surface layer provided as an outermost layer and composed of a fluororesin A; and a primer layer provided in contact with the surface layer,
wherein the primer layer contains a fluororesin B and a fluorine-containing ion conductive agent.

This invention is characterized in that at least one conductive agent selected from fluorine-containing ion conductive agents is used as a conductive agent added to a primer layer. Even when the fluorine-containing ion conductive agent is contained in the primer layer in a large amount (for example, 40% by weight), the bonding force of the primer layer is not decreased. The reason for this is believed to be as follows. Similarly to fluororesins used in the surface layer and the primer layer, the fluorine-containing ion conductive agents have structures of C-F and F- in the structures thereof. Therefore, the interfaces of the conductive agents have good affinity with the fluororesins constituting the surface layer and the primer layer. Thus, even when a large amount of electrically conductive filler is contained in the primer layer, the electrically conductive filler does not decrease the bonding force of the primer layer.

Accordingly, since a high adhesive force between the surface layer composed of a fluororesin and a layer disposed thereunder, for example, a base composed of polyimide or an elastic layer composed of silicone rubber is maintained by this primer layer, a fixing belt that also has good sheet-passing durability can be obtained.

The fluorine-containing ion conductive agents are compounds (fluorine-based ion conductive compounds) having fluorine in the molecules thereof and having ionic conductivity. Examples thereof include sulfonates represented by a formula $Rf—SO_3M$ (wherein Rf represents an alkyl group containing fluorine and M represents H, K, Na, $NH_4$, or Li, and each of these represents the same in the formulae below); disulfonates represented by $MO_3S—(CF_2)_n—SO_3M$; sulfonic anhydrides represented by $(Rf—SO_2)_2O$; sulfonic esters represented by $Rf—SO_3R$ (wherein R represents an alkyl group or the like); sulfonyl chlorides represented by $Rf—SO_2Cl$; sulfonimides and cyclic sulfonimides represented by $(Rf—SO_2)_2NM$; sulfonamides represented by $Rf—SO_2NHM$; fluorosulfonylimide derivatives represented by $(F—SO_2)_2NM$; and ionic liquids having a fluorine-containing anion having any of the above structures, such as a sulfonic acid anion, an imide anion, or a fluorosulfonylimide anion.

These fluorine-containing ion conductive agents have a function of an ionic conductive agent. Accordingly, a primer layer containing any of these fluorine-containing ion conductive agents exhibits electrical conductivity and functions as an electrically conductive layer. In the case where a fixing belt (a fixing roller or a fixing sleeve) is prepared using this primer layer, electrostatic charging on the surface layer of the fixing belt is prevented and electrostatic charge can be efficiently eliminated. Thus, it is possible to provide a fixing belt which prevents offset and is capable of forming a clear image, and thus which provides a high image quality.

These fluorine-containing ion conductive agents are preferably colorless compounds such as potassium salts and lithium salts (compounds in which M in the above formula is K or Li). By using such a colorless compound, the appearance of the fixing belt is not impaired even when the fluororesin constituting the surface layer is transparent.

The tubular base constituting the fixing belt of the present invention is a tubular belt, a columnar or cylindrical roller, or the like, and the primer layer and the surface layer are provided on an outer circumference of this tubular base (refer to FIGURE). The surface layer is an outermost layer of the fixing belt of the present invention and is provided so as to be in contact with the primer layer. As illustrated in part (b) of FIGURE, another layer, for example, an elastic layer for improving fixability of a color toner may further be provided between the tubular base and the surface layer.

Specifically, examples of the fixing belt of the present invention include a fixing roller including three layers composed of a tubular base, a primer layer, and a surface layer as illustrated in part (a) of FIGURE and a fixing sleeve including five layers composed of a tubular base, a primer layer, an elastic layer, a primer layer, and a surface layer as illustrated in part (b) of FIGURE. Hereinafter, a primer layer that is in contact with a surface layer is referred to as a "primer layer (I)" and a primer layer that is provided between a tubular base and an elastic layer in a fixing sleeve is referred to as a "primer layer (II)". The primer layer obtained by mixing a fluorine-containing ion conductive agent with a fluororesin B as described-above (i.e., the primer layer constituting the present invention) is the primer layer (I).

The resin constituting the surface layer and the primer layer (I) mainly contains a fluororesin. Specifically, the resin contains a fluororesin as a main component, and preferably 50% by weight or more and more preferably 80% by weight or more of the resin is composed of a fluororesin. However, the resin may contain other resins etc. as long as the gist of the present invention is not impaired. This resin may be composed of only a fluororesin.

When the resin constituting the surface layer is composed of a resin mainly containing a fluororesin, the surface layer can have a good releasing property and good wear resistance. In addition, when each of the surface layer and the primer layer (I) is mainly composed of a fluororesin, high adhesion between these two layers can be obtained.

The fluororesins constituting the surface layer and the primer layer (I) may be the same or different from each other as long as the gist of the present invention is not impaired, that is, the adhesion between the surface layer and the primer layer (I) can be maintained. Herein, a fluororesin constituting the surface layer is referred to as a "fluororesin A", and a fluororesin constituting the primer layer (I) is referred to as a "fluororesin B".

An invention according to the disclosure is the fixing belt as described above, wherein the fluorine-containing ion conductive agent is at least one selected from the group consisting of potassium pentafluoroethanesulfonate, potassium trifluoromethanesulfonate, and lithium trifluoromethanesulfonate. The fluorine-containing ion conductive agent is preferably a potassium salt, a lithium salt, or the like. Examples of the potassium salts include potassium trifluoromethanesulfonate, potassium pentafluoroethanesulfonate, potassium heptafluoropropanesulfonate, potassium nonafluorobutanesulfonate, bis(fluorosulfonyl)imide potassium salt, and potassium perfluoroalkyldisulfonate. Examples of the lithium salts include lithium trifluoromethanesulfonate, lithium pentafluoroethanesulfonate, lithium heptafluoropropanesulfonate, lithium nonafluorobutanesulfonate, bis(fluorosulfonyl)imide lithium salt, and lithium perfluoroalkyldisulfonate. Among these salts, potassium pentafluoroethanesulfonate, potassium trifluoromethanesulfonate, and lithium trifluoromethanesulfonate can be cited as preferred fluorine-containing ion conductive agents. These fluorine-containing ion conductive agents have not only high initial electrical conductivity but also high electrical conductivity after an endurance test.

An invention according to the disclosure is the fixing belt arrangements described above, wherein a mixing ratio of the fluorine-containing ion conductive agent to the total amount of the fluororesin B and the fluorine-containing ion conductive agent is 1% to 40% by weight. When the mixing ratio of the fluorine-containing ion conductive agent to the total amount of the fluororesin B and the fluorine-containing ion conductive agent is less than 1% by weight, sufficient electrical conductivity may not be imparted to the primer layer (I) and offset may not be sufficiently prevented. On the other hand, when the ratio exceeds 40% by weight, adhesion between the primer layer and the surface layer decreases, and the primer layer may not sufficiently function as a bonding layer. The mixing ratio of the fluorine-containing ion conductive agent is more preferably 3% to 40% by weight, and particularly preferably 5% to 40% by weight.

An invention according to the disclosure is any of the fixing belt arrangements described above, wherein the tubular base is a tube composed of a metal or polyimide. A metal or a resin having a high mechanical strength and high heat resistance can be used as the material of the tubular base. These materials are preferable because they are excellent in terms of both mechanical strength and heat resistance. Examples of the metal include aluminum and SUS having a high mechanical strength and high corrosion resistance. As for the resin, polyimide is particularly preferable because polyimide is excellent in terms of both the mechanical strength and heat resistance. It should be noted that the term "tube" refers to both a pipe and an endless belt.

An invention according to the disclosure is any of the fixing belt arrangements described above, further including an elastic layer between the primer layer and the tubular base. The present embodiment can be applied to both a fixing roller and a fixing sleeve, but is particularly preferably applied to a fixing sleeve including an elastic layer. The elastic layer is a layer provided for imparting elasticity to the fixing belt and is composed of an elastic body such as silicone rubber. Since fixability of a color toner can be improved by imparting elasticity to the fixing belt, the fixing sleeve including an elastic layer is suitably used in a color copying machine, a color printer, and the like.

Advantageous Effects of Invention

The fixing belt of the present invention has a high effect of preventing offset and the like, can form a clear image, and also has high adhesion between a surface layer and another layer.

DESCRIPTION OF EMBODIMENTS

Next, embodiments, in particular, best embodiments for carrying out the present invention will be described. However, the scope of the present invention is not limited to these embodiments, and various modifications may be made as long as the gist of the present invention is not impaired.

FIGURE is a view schematically illustrating an example of a fixing belt of the present invention and is a cross-sectional view orthogonal to a rotation axis of the fixing belt. Part (a) of FIGURE illustrates an example of a fixing roller including three layers composed of a base 1, a primer layer (I) 3, and a surface layer 5. Part (b) of FIGURE illustrates an example of a fixing sleeve including five layers. The fixing sleeve further includes a rubber elastic layer 4 between a base 1 and a surface layer 5, and includes a primer layer (I) 3 between the rubber elastic layer 4 and the surface layer 5, and a primer layer (II) 31 between the base 1 and the rubber elastic layer 4. These fixing roller and fixing sleeve are included in the fixing belt of the present invention. The description below can be applied to both the fixing roller illustrated in part (a) of FIGURE and the fixing sleeve illustrated in part (b) of FIGURE, unless otherwise stated.

The base 1 is a columnar solid composed of a polyimide resin, i.e., a polyimide tube. As described above, an endless belt composed of a polyimide resin or the like can be used as the base. Alternatively, other heat-resistant resins such as a polyamide-imide resin or metal pipes composed of a metal such as SUS or aluminum may also be used as the material of the base instead of the polyimide resin. However, from the standpoint of the ease of production, heat resistance, the modulus of elasticity, the strength, etc., a polyimide resin is preferable.

An example of a method for producing the base 1 includes applying an organic solvent solution (polyimide varnish) of a polyimide precursor (polyamic acid) onto an outer circumferential surface of a cylindrical metal core by a dispenser method or the like, and dehydrating and cyclizing the precursor by heating to obtain polyimide. An appropriate amount of filler for improving thermal conductivity is preferably mixed with the polyimide precursor. The heating temperature is about 350° C. to 450° C.

An example of the polyimide varnish is U-Varnish-S produced by Ube Industries, Ltd., and examples of the organic solvent include dimethylacetamide and N-methylpyrrolidone. However, the polyimide varnish and the organic solvent are not limited thereto. After imidization, the resulting polyimide film may be used as a base integrated with the core, or the core may be replaced with another core. In the case where the base is an endless belt, the imidized film (polyimide tube) may be detached from the core and used. In the case where the base is a polyimide tube, the thickness thereof is preferably about 30 to 80 μm from the standpoint of durability and elasticity.

The surface layer 5 is composed of a fluororesin such as polytetrafluoroethylene (PTFE), a tetrafluoroethylene-perfluoroalkylvinylether copolymer (PFA), or a tetrafluoroethylene-hexafluoropropylene copolymer (FEP). From the standpoint of heat resistance, PTFE or PFA is preferably used as the fluororesin constituting the surface layer 5.

The thickness of the surface layer 5 is preferably 1 to 50 μm, more preferably 2 to 35 μm and still more preferably 3 to 25 μm. If the thickness of the surface layer 5 (fluororesin layer) is excessively small, the surface layer 5 has poor durability. Consequently, with an increase in the number of copies, the surface layer 5 may be worn out in an early stage, resulting in a degradation of the releasing property. If the thickness of the surface layer 5 is excessively large, thermal conductivity of the whole fixing belt decreases, and fixability tends to decrease.

The primer layer (I) 3 is composed of a fluororesin containing a fluorine-containing ion conductive agent. As for the fluorine-containing ion conductive agent, a single compound or a mixture of two or more compounds selected from the fluorine-containing ion conductive agents exemplified above may be used.

Examples of the fluororesin constituting the primer layer (I) 3 include PTFE, PFA, and FEP as in the case of the surface layer 5. From the standpoint of heat resistance, PTFE or PFA is preferably used. A fluororesin different from the fluororesin constituting the surface layer 5 may also be used. For example, PTFE may be used as the surface layer 5, and FEP may be used as the primer layer (I) 3. However, if the structures and constituent elements of the two layers are significantly different from each other, the function of the primer layer as a bonding layer may be degraded. Accordingly, it is preferable to use fluororesins that do not cause this problem.

The thickness of the primer layer (I) 3 is preferably 1 to 10 μm. If the thickness of the primer layer (I) 3 is excessively small, the effect of a bonding layer and an electrically conductive layer may not be sufficiently obtained. On the other hand, if the thickness of the primer layer (I) 3 is excessively large, thermal conductivity of the whole fixing belt decreases, and fixability may be decreased.

Examples of the material of the rubber elastic layer 4 provided in the fixing sleeve illustrated in part (b) of FIGURE include silicone rubber and fluororubber. From the standpoint of heat resistance and durability, silicone rubber is preferably used. Examples of the resin constituting the primer layer (II) 31 include rubbers, resins, and fluororesins.

For example, in order to improve thermal conductivity, a filler other than the fluorine-containing ion conductive agent may be added to the primer layer (I) 3 and the primer layer (II) 31. An inorganic filler such as titanium oxide, silicon carbide, boron nitride, silica, or alumina is preferably used as the filler because of its high thermal conductivity, for example.

However, in the case where a filler is added to the primer layer (I) 3 and the amount of filler added to the primer layer is increased, a bonding function of the primer layer is degraded and, for example, separation of the surface layer tends to occur. Furthermore, the filler affects the surface roughness of the surface layer and the releasing property, and tends to decrease these properties. Accordingly, the amount of filler added is determined within a range in which these problems do not occur. For example, although a carbon black powder or the like may also be added, addition of a large amount of carbon black powder causes problems such as a decrease in the adhesion and impairment of the appearance, as described above. Therefore, it is necessary to determine the amount of carbon black powder added so as to be within a range (preferably 1% by weight or less) in which these problems do not occur.

Furthermore, in both the cases of the primer layer (I) 3 and the primer layer (II) 31, with an increase in the amount of filler added to the primer layer, the mechanical strength of the primer layer tends to decrease. Therefore, the amount of filler added is preferably determined so as to be within a range in which this problem does not occur.

The method for producing the fixing belt of the present invention is not particularly limited. However, the fixing belt of the present invention can be produced by, for example, sequentially conducting steps 1) to 5).
1) A base 1 is formed as described above (in the case of a polyimide resin). In the case of the production of a fixing sleeve, a primer layer (II) 31 and a rubber elastic layer 4 are sequentially formed on the base 1 in accordance with known methods or the like.
2) The outer circumferential surface of the base 1 or the rubber elastic layer 4 is polished to adjust the outer diameter and the shape.
3) A fluororesin (e.g., PFA) and a fluorine-containing ion conductive agent that constitute a primer layer (I) 3 are dispersed and dissolved in a dispersion medium such as water to prepare a dispersion liquid. This dispersion liquid is applied onto the base 1 or rubber elastic layer 4, the outer circumferential surface of which has been polished.
4) The applied fluororesin is baked by conducting heat treatment to form the primer layer (I) 3.
5) A dispersion liquid of a fluororesin (e.g., PFA) is applied onto the surface of the formed primer layer (I) 3. The applied fluororesin is baked by conducting heat treatment to form a surface layer.

The dispersion liquid of the fluororesin used in the production of the primer layer (I) 3 can be prepared by mixing an aqueous solution of the fluorine-containing ion conductive agent with an aqueous dispersion liquid of the fluororesin. The method for preparing the aqueous dispersion liquid is not particularly limited. A dispersant and a surfactant for improving the dispersion state, and a coupling agent for improving affinity with an inorganic filler may be added to the aqueous dispersion liquid, if necessary.

The fixing belt of the present invention is used in, for example, a fixing unit of an image-forming apparatus. In the fixing unit, a heating source is arranged in the fixing belt. The fixing belt faces a pressure roller composed of a rubber roller or the like, and is brought into contact with the pressure roller under pressure. A transfer-receiving material to which a toner image has been transferred is passed between the fixing belt and the pressure roller. Consequently, unfixed toner is melted by heating and is fixed on the transfer-receiving material.

EXAMPLES

Next, Examples for more specifically explaining the present invention will be described. However, the Examples do not limit the scope of the present invention.

Examples 1 to 48 and Comparative Example

Fixing belts (fixing sleeves) were prepared by the method and under the conditions described below. A surface resistance of a primer layer and a peel strength between an elastic layer and a surface layer were measured, and an offset evaluation and a sheet-passing durability test were conducted. First, the method and the conditions for preparing the fixing belts will be described.
(Formation of Base and Primer Layer (II))

A circular column composed of a polyimide resin and having an outer diameter of 18.2 mm and a length of 233 mm was dipped in X-34-173 (produced by Shin-Etsu Chemical Co., Ltd., silicone resin-based primer: referred to as "primer liquid (a)") and pulled up (by a dipping method) to apply the primer liquid (a) onto an outer circumferential surface of the base. Subsequently, heating was conducted at 200° C. for 30 minutes to solidify the primer liquid (a). Thus, a primer layer (II) having a thickness of 4 μm was formed on the outer circumference of the base.
(Formation of Elastic Layer)

As silicone rubber forming an elastic layer, X-34-3045 (silicone rubber produced by Shin-Etsu Chemical Co., Ltd.) was used. The silicone rubber was applied by a dispenser method so as to have a thickness of 320 μm.
(Formation of Primer Layer (I))

A primer liquid (b) was prepared by mixing a conductive agent described below with PL-992CL (fluorine-based primer produced by E.I. du Pont de Nemours and Company) in an amount shown in Tables I to VI. The belt on which the elastic layer had been formed as described above was dipped in the primer liquid (b) and pulled up (by a dipping method) to apply the primer liquid (b) onto the outer circumferential surface of the elastic layer. Subsequently, baking was conducted by heating the resulting belt at 220° C. for 30 minutes. Thus, a primer layer (I) having a thickness of 4 μm was formed on the outer circumference of the elastic layer.

Conductive agents used in Examples and Comparative Example will be described below.

Comparative Example

Carbon black: Lion Paste produced by Lion Corporation (This conductive agent is represented by "carbon black" in the table.)

Example 1 and Examples 13 to 15

Potassium trifluoromethanesulfonate (Chemical formula "$CF_3SO_3K$"): EF-12 produced by Mitsubishi Materials Corporation Example 2 and Examples 16 to 18

Lithium trifluoromethanesulfonate (Chemical formula "$CF_3SO_3Li$"): EF-15 produced by Mitsubishi Materials Corporation Example 3 and Examples 19 to 21

$(CF_3SO_2)_2NK$: EF-N112 produced by Mitsubishi Materials Corporation

Example 4 and Examples 22 to 24

$(CF_3SO_2)_2NLi$: EF-N115 produced by Mitsubishi Materials Corporation

Example 5 and Examples 25 to 27

$CF_2(CF_2SO_2)_2NK$: EF-N302 produced by Mitsubishi Materials Corporation

Example 6 and Examples 28 to 30

$CF_2(CF_2SO_2)_2NLi$: EF-N305 produced by Mitsubishi Materials Corporation

Example 7 and Examples 31 to 33

$(C_4F_9SO_2)_2NK$: EF-N442 produced by Mitsubishi Materials Corporation

Example 8 and Examples 34 to 36

$(C_4F_9SO_2)_2NLi$: EF-N445 produced by Mitsubishi Materials Corporation

Example 9 and Examples 37 to 39

$C_2F_5SO_3K$: EF-22 produced by Mitsubishi Materials Corporation

Example 10 and Examples 40 to 42

$C_3F_7SO_3K$: EF-32 produced by Mitsubishi Materials Corporation

Example 11 and Examples 43 to 45

$C_4F_9SO_3K$: EF-42 produced by Mitsubishi Materials Corporation

Example 12 and Examples 46 to 48

$LiO_3S(CF_2)_3SO_3Li$: EF-3005 produced by Mitsubishi Materials Corporation (Regarding Examples, these conductive agents are each represented by the chemical formula in the table.)

(Formation of Surface Layer)

A dispersion liquid of PFA, EM-565CL (produced by E.I. du Pont de Nemours and Company) was applied onto the outer circumference of the primer (I) formed as described above by a dipping method so as to have a thickness of 10 μm. Subsequently, baking was conducted at 360° C. for 30 minutes to form a surface layer. Thus, fixing belts of Examples and Comparative Example were prepared.

[Surface resistance of primer layer] The surface resistance of the primer layer was measured in accordance with JIS K6911. The results are shown in Tables I to VI.

[Peel strength between elastic layer and surface layer] The peel strength between the elastic layer and the surface layer was measured in accordance with MS K6854-2. The results are shown in Tables I to VI.

[Offset evaluation] The fixing belt was installed in a printer. An offset property was examined by visual observation, and was evaluated on the basis of the criteria described below. The results are shown in Tables I to VI.

◯: A double image was not formed.

x: A double image was formed.

[Sheet-passing durability test] The fixing belt was installed in a printer. Sheet-passing durability was examined by causing a sheet to pass through the printer, and was evaluated on the basis of the criteria described below. The results are shown in Tables I to VI.

◯: After the sheet-passing durability test, separation did not occur.

x: After the sheet-passing durability test, separation occurred.

[Appearance] The appearance was evaluated on the basis of the criteria described below. The results are shown in Tables I to VI.

◯: Color unevenness was not observed.

x: Color unevenness was observed.

TABLE I

| | | Comparative example | Example 1 | Example 2 | Example 3 | Example 4 | Example 5 | Example 6 |
|---|---|---|---|---|---|---|---|---|
| Conductive agent of primer layer (I) | Type | Carbon black | $CF_3SO_3K$ | $CF_3SO_3Li$ | $(CF_3SO_2)_2NK$ | $(CF_3SO_2)_2NLi$ | $CF_2(CF_2SO_2)_2NK$ | $CF_2(CF_2SO_2)_2NLi$ |
| | Content (in terms of solid content, wt %) | 1 | 5 | 5 | 5 | 5 | 5 | 5 |
| Surface resistance of primer layer (I) (Ω/□) | | $10^{10}$ to $10^{12}$ | $10^8$ to $10^9$ | $10^8$ to $10^9$ | $10^8$ to $10^9$ | $10^8$ to $10^9$ | $10^8$ to $10^9$ | $10^8$ to $10^9$ |
| Peel strength (gf/cm) | | 120 | 160 | 150 | 140 | 140 | 150 | 160 |
| Offset evaluation | | Δ | ◯ | ◯ | ◯ | ◯ | ◯ | ◯ |
| Sheet-passing durability test | | X | ◯ | ◯ | ◯ | ◯ | ◯ | ◯ |
| Appearance | | X | ◯ | ◯ | ◯ | ◯ | ◯ | ◯ |

TABLE II

| | | Example 7 | Example 8 | Example 9 | Example 10 | Example 11 | Example 12 |
|---|---|---|---|---|---|---|---|
| Conductive agent of primer layer (I) | Type | $(C_4F_9SO_2)_2NK$ | $(C_4F_9SO_2)_2NLi$ | $C_2F_5SO_3K$ | $C_3F_7SO_3K$ | $C_4F_9SO_3K$ | $LiO_3S(CF_2)_3SO_3Li$ |
| | Content (in terms of solid content, wt %) | 5 | 5 | 5 | 5 | 5 | 5 |
| Surface resistance of primer layer (I) ($\Omega/\square$) | | $10^8$ to $10^9$ | $10^8$ to $10^9$ | $10^8$ to $10^9$ | $10^8$ to $10^9$ | $10^8$ to $10^9$ | $10^8$ to $10^9$ |
| Peel strength (gf/cm) | | 140 | 150 | 140 | 160 | 170 | 140 |
| Offset evaluation | | ○ | ○ | ○ | ○ | ○ | ○ |
| Sheet-passing durability test | | ○ | ○ | ○ | ○ | ○ | ○ |
| Appearance | | ○ | ○ | ○ | ○ | ○ | ○ |

TABLE III

| | | Example 13 | Example 14 | Example 15 | Example 16 | Example 17 | Example 18 | Example 19 | Example 20 | Example 21 |
|---|---|---|---|---|---|---|---|---|---|---|
| Conductive agent of primer layer (I) | Type | $CF_3SO_3K$ | $CF_3SO_3K$ | $CF_3SO_3K$ | $CF_3SO_3Li$ | $CF_3SO_3Li$ | $CF_3SO_3Li$ | $(CF_3SO_2)_2NK$ | $(CF_3SO_2)_2NK$ | $(CF_3SO_2)_2NK$ |
| | Content (in terms of solid content, wt %) | 4 | 7 | 10 | 4 | 7 | 10 | 4 | 7 | 10 |
| Surface resistance of primer layer (I) ($\Omega/\square$) | | $10^8$ to $10^9$ | $10^8$ to $10^9$ | $10^8$ to $10^9$ | $10^8$ to $10^9$ | $10^8$ to $10^9$ | $10^8$ to $10^9$ | $10^8$ to $10^9$ | $10^8$ to $10^9$ | $10^8$ to $10^9$ |
| Peel strength (gf/cm) | | 160 | 160 | 160 | 150 | 150 | 150 | 140 | 140 | 140 |
| Offset evaluation | | ○ | ○ | ○ | ○ | ○ | ○ | ○ | ○ | ○ |
| Sheet-passing durability test | | ○ | ○ | ○ | ○ | ○ | ○ | ○ | ○ | ○ |
| Appearance | | ○ | ○ | ○ | ○ | ○ | ○ | ○ | ○ | ○ |

TABLE IV

| | | Example 22 | Example 23 | Example 24 | Example 25 | Example 26 |
|---|---|---|---|---|---|---|
| Conductive agent of primer layer (I) | Type | $(CF_3SO_2)_2NLi$ | $(CF_3SO_2)_2NLi$ | $(CF_3SO_2)_2NLi$ | $CF_2(CF_2SO_2)_2NK$ | $CF_2(CF_2SO_2)_2NK$ |
| | Content (in terms of solid content, wt %) | 4 | 7 | 10 | 4 | 7 |
| Surface resistance of primer layer (I) ($\Omega/\square$) | | $10^8$ to $10^9$ | $10^8$ to $10^9$ | $10^8$ to $10^9$ | $10^8$ to $10^9$ | $10^8$ to $10^9$ |
| Peel strength (gf/cm) | | 140 | 140 | 140 | 150 | 150 |
| Offset evaluation | | ○ | ○ | ○ | ○ | ○ |
| Sheet-passing durability test | | ○ | ○ | ○ | ○ | ○ |
| Appearance | | ○ | ○ | ○ | ○ | ○ |

| | | Example 27 | Example 28 | Example 29 | Example 30 |
|---|---|---|---|---|---|
| Conductive agent of primer layer (I) | Type | $CF_2(CF_2SO_2)_2NK$ | $CF_2(CF_2SO_2)_2NLi$ | $CF_2(CF_2SO_2)_2NLi$ | $CF_2(CF_2SO_2)_2NLi$ |
| | Content (in terms of solid content, wt %) | 10 | 4 | 7 | 10 |
| Surface resistance of primer layer (I) ($\Omega/\square$) | | $10^8$ to $10^9$ | $10^8$ to $10^9$ | $10^8$ to $10^9$ | $10^8$ to $10^9$ |
| Peel strength (gf/cm) | | 150 | 160 | 160 | 160 |
| Offset evaluation | | ○ | ○ | ○ | ○ |
| Sheet-passing durability test | | ○ | ○ | ○ | ○ |
| Appearance | | ○ | ○ | ○ | ○ |

TABLE V

|  |  | Example 31 | Example 32 | Example 33 | Example 34 |
|---|---|---|---|---|---|
| Conductive agent of primer layer (I) | Type | $(C_4F_9SO_2)_2NK$ | $(C_4F_9SO_2)_2NK$ | $(C_4F_9SO_2)_2NK$ | $(C_4F_9SO_2)_2NLi$ |
|  | Content (in terms of solid content, wt %) | 4 | 7 | 10 | 4 |
| Surface resistance of primer layer (I) ($\Omega/\square$) |  | $10^8$ to $10^9$ | $10^8$ to $10^9$ | $10^8$ to $10^9$ | $10^8$ to $10^9$ |
| Peel strength (gf/cm) |  | 140 | 140 | 140 | 150 |
| Offset evaluation |  | ○ | ○ | ○ | ○ |
| Sheet-passing durability test |  | ○ | ○ | ○ | ○ |
| Appearance |  | ○ | ○ | ○ | ○ |

|  |  | Example 35 | Example 36 | Example 37 | Example 38 | Example 39 |
|---|---|---|---|---|---|---|
| Conductive agent of primer layer (I) | Type | $(C_4F_9SO_2)_2NLi$ | $(C_4F_9SO_2)_2NLi$ | $C_2F_5SO_3K$ | $C_2F_5SO_3K$ | $C_2F_5SO_3K$ |
|  | Content (in terms of solid content, wt %) | 7 | 10 | 4 | 7 | 10 |
| Surface resistance of primer layer (I) ($\Omega/\square$) |  | $10^8$ to $10^9$ | $10^8$ to $10^9$ | $10^8$ to $10^9$ | $10^8$ to $10^9$ | $10^8$ to $10^9$ |
| Peel strength (gf/cm) |  | 150 | 150 | 140 | 140 | 140 |
| Offset evaluation |  | ○ | ○ | ○ | ○ | ○ |
| Sheet-passing durability test |  | ○ | ○ | ○ | ○ | ○ |
| Appearance |  | ○ | ○ | ○ | ○ | ○ |

TABLE VI

|  |  | Example 40 | Example 41 | Example 42 | Example 43 | Example 44 | Example 45 |
|---|---|---|---|---|---|---|---|
| Conductive agent of primer layer (I) | Type | $C_3F_7SO_3K$ | $C_3F_7SO_3K$ | $C_3F_7SO_3K$ | $C_4F_9SO_3K$ | $C_4F_9SO_3K$ | $C_4F_9SO_3K$ |
|  | Content (in terms of solid content, wt %) | 4 | 7 | 10 | 4 | 7 | 10 |
| Surface resistance of primer layer (I) ($\Omega/\square$) |  | $10^8$ to $10^9$ | $10^8$ to $10^9$ | $10^8$ to $10^9$ | $10^8$ to $10^9$ | $10^8$ to $10^9$ | $10^8$ to $10^9$ |
| Peel strength (gf/cm) |  | 160 | 160 | 160 | 170 | 170 | 170 |
| Offset evaluation |  | ○ | ○ | ○ | ○ | ○ | ○ |
| Sheet-passing durability test |  | ○ | ○ | ○ | ○ | ○ | ○ |
| Appearance |  | ○ | ○ | ○ | ○ | ○ | ○ |

|  |  | Example 46 | Example 47 | Example 48 |
|---|---|---|---|---|
| Conductive agent of primer layer (I) | Type | $LiO_3S(CF_2)_3SO_3Li$ | $LiO_3S(CF_2)_3SO_3Li$ | $LiO_3S(CF_2)_3SO_3Li$ |
|  | Content (in terms of solid content, wt %) | 4 | 7 | 10 |
| Surface resistance of primer layer (I) ($\Omega/\square$) |  | $10^8$ to $10^9$ | $10^8$ to $10^9$ | $10^8$ to $10^9$ |
| Peel strength (gf/cm) |  | 140 | 140 | 140 |
| Offset evaluation |  | ○ | ○ | ○ |
| Sheet-passing durability test |  | ○ | ○ | ○ |
| Appearance |  | ○ | ○ | ○ |

As is apparent from the results shown in Tables I to VI, in Comparative Example, in which carbon black was used as the conductive agent of the primer layer (I), although the content of the carbon black was 1% by weight, (accordingly, the surface resistance of the primer layer (I) was high), the separation strength (peel strength) between the primer layer (I) and the surface layer was low, and thus adhesion was poor. In contrast, in Examples 1 to 48, which are examples of the present invention, although the content of the conductive agent was 4% to 10% by weight, (accordingly, the surface resistance of the primer layer (I) was low), good adhesion was obtained. As a result, regarding the sheet-passing durability test and the appearance, good results were also obtained in Examples 1 to 48, whereas significantly inferior results were obtained in Comparative Example. Furthermore, regarding the offset evaluation, good results were obtained in Examples 1 to 48, as compared with Comparative Example.

REFERENCE SIGNS LIST

Figure 1:
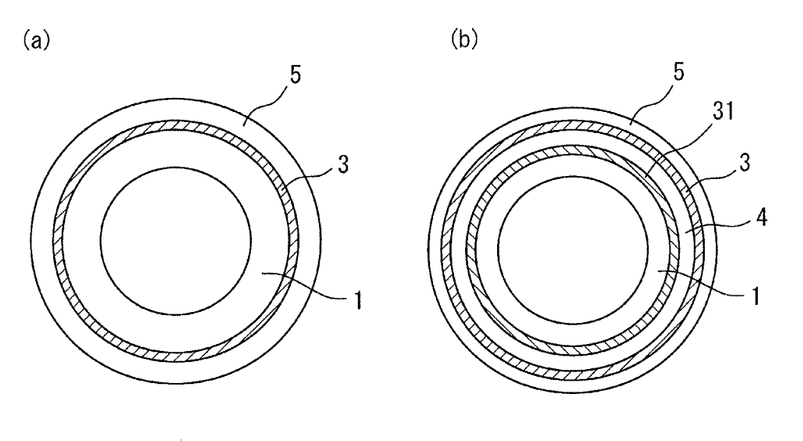
FIGURE is a cross-sectional view of an example of a fixing belt, the cross-sectional view being orthogonal to a rotation axis of the fixing belt.

1 base
3 primer layer (I)
31 primer layer (II)
4 elastic layer
5 surface layer

The invention claimed is:

1. A fixing belt comprising a tubular base; a surface layer provided as an outermost layer and composed of a fluororesin A; and a primer layer provided in contact with the surface layer,
wherein the primer layer contains a fluororesin B and a fluorine-containing ion conductive agent, wherein a mixing ratio of the fluorine-containing ion conductive agent to the total amount of the fluororesin B and the fluorine-containing ion conductive agent is 5% to 40% by weight, and
the fluorine-containing ion conductive agent is at least one selected from the group consisting of potassium trifluoromethanesulfonate, potassium pentafluoroethanesulfonate, potassium heptafluoropropanesulfonate, potassium nonafluorobutanesulfonate, bis(fluorosulfonyl)imide potassium salt, and potassium perfluoroalkyldisulfonate.

2. The fixing belt, according to claim 1, wherein the fluorine-containing ion conductive agent is at least one selected from the group consisting of potassium pentafluoroethanesulfonate and potassium trifluoromethanesulfonate.

3. The fixing belt according to claim 1, wherein the tubular base is a tube composed of a metal or polyimide.

4. The fixing belt according to claim 1, further comprising an elastic layer between the primer layer and the tubular base.

\* \* \* \* \*